United States Patent [19]
Mizuno et al.

[11] Patent Number: 6,139,808
[45] Date of Patent: Oct. 31, 2000

[54] CATALYST FOR EXHAUST GAS PURIFICATION AND SYSTEM FOR EXHAUST GAS PURIFICATION

[75] Inventors: Hiroshige Mizuno, Tajimi; Naomi Noda, Ichonomiya; Yukinari Shibagaki, Kounan; Akira Takahashi, Nagoya, all of Japan

[73] Assignee: NGK Insulators, Ltd., Japan

[21] Appl. No.: 08/985,523

[22] Filed: Dec. 5, 1997

[30] Foreign Application Priority Data

Dec. 20, 1996 [JP] Japan ................................. 8-341835

[51] Int. Cl.$^7$ .......................... B01D 53/34; B01D 53/92; F01N 3/20
[52] U.S. Cl. ........................ 422/180; 422/171; 422/177; 502/325; 502/328; 502/330
[58] Field of Search ........................ 422/171, 177, 422/174, 180, 211, 222; 60/299; 502/325, 328, 330

[56] References Cited

U.S. PATENT DOCUMENTS 5,051,392  9/1991  Mabilon et al. ........................ 502/303
5,296,198  3/1994  Abe et al. ................................ 422/180

FOREIGN PATENT DOCUMENTS 7-16466    1/1995  Japan .
9-000928   1/1997  Japan .

OTHER PUBLICATIONS

Derwent Accession No. 94–045140, Questel Telesystems (WPIL); Derwent Publications Ltd., London: & JP 6–378 A (Nissan Motor).

Primary Examiner—Hien Tran

[57] ABSTRACT

A catalyst for exhaust gas purification is capable of purifying the hydrocarbons, nitrogen oxides and carbon monoxide present in the exhaust gas discharged from an internal combustion engine. The catalyst has a carrier and a catalyst layer containing at least one kind of noble metal, Ba and Cs, formed on the carrier. This catalyst for exhaust gas purification is improved in hydrocarbon purification ability for a low-temperature fuel-rich exhaust gas (such as exhaust gas emitted during cold start) of automobile.

16 Claims, 3 Drawing Sheets

CATALYST FOR EXHAUST GAS PURIFICATION AND SYSTEM FOR EXHAUST GAS PURIFICATION

BACKGROUND OF THE INVENTION

1. Field of the Invention

The present invention relates to a catalyst used for purifying the harmful substances such as hydrocarbons (HC), nitrogen oxides (NOx), carbon monoxide (CO), etc. present in the exhaust gas discharged from an internal combustion engine of automobile or the like.

2. Description of Related Art

Various catalyst techniques have heretofore been proposed for purification of the exhaust gas discharged from an internal combustion engine of automobile or the like. Recently, there have been proposed a number of catalysts comprising not only a noble metal (e.g. Pd) (which is an ordinary catalyst active component) but also an alkaline earth metal, an alkali metal or an oxide thereof. For example, in Japanese Patent Application Laid-Open No. 237384/1993, a catalyst is disclosed for exhaust gas purification obtained by coating, on a monolithic structure, a catalyst active component containing a noble metal (e.g. Pd or Rh), an alkaline earth metal oxide, a lanthanum oxide, a cerium oxide, a zirconium oxide and a heat-resistant inorganic oxide.

In recent years., it has been one of the most important technical tasks to effectively purify the unburnt combustible components (e.g. HC, CO and $H_2$), in particular, HC discharged during the cold start of automobile engine. During the cold start, the engine is usually operated in a rich fuel-to-air ratio and HC is contained in the exhaust gas in a large amount; meanwhile, the catalyst used is still below the operating temperature and its purification ability is low; as a result, a large portion of HC tends to be discharged into the atmosphere without being purified. Hence, a technique is desired which can effectively purify the HC present in the exhaust gas discharged during the cold start of engine.

When the above-mentioned prior art is investigated from such a standpoint, the catalyst disclosed in Japanese Patent Application Laid-Open No. 237384/1993 uses an alkaline earth metal oxide in order to increase the Pd purifiability for NOx in a fuel-rich atmosphere; however, the literature pays little attention to the purification of HC and CO in a fuel-rich atmosphere.

OBJECT AND SUMMARY OF THE INVENTION

The present invention has been completed in view of the above situation. The object of the present invention is to provide a catalyst for exhaust gas purification wherein a particular alkaline earth metal and a particular alkali metal both intended for an increase in low-temperature light-off performance of catalyst is combined with a noble metal and, thereby, the catalyst's purification ability for HC particularly in a low-temperature and fuel-rich atmosphere (such as experienced during the cold start of automobile engine) is increased.

According to the present invention, there is provided a catalyst for exhaust gas purification capable of purifying the hydrocarbons, nitrogen oxides and carbon monoxide present in the exhaust gas discharged from an internal combustion engine, which catalyst comprises a carrier and a catalyst layer containing at least one kind of noble metal, Ba and Cs, formed on the carrier.

According to the present invention, there is also provided a system for exhaust gas purification comprising:

the above catalyst for exhaust gas purification, provided in the exhaust pipe of internal combustion engine, and an adsorbent having hydrocarbon adsorbability, also provided in the exhaust pipe.

DETAILED DESCRIPTION OF THE PREFERRED EMBODIMENT

Figure 1:
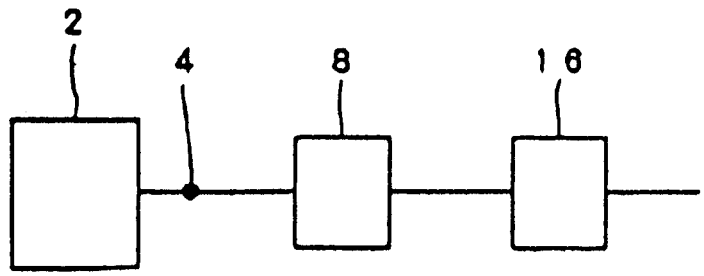
FIG. 1 is a schematic drawing showing a system for exhaust gas purification used in Examples.

Alkali metals, alkaline earth metals, oxides thereof, etc. have an electron-donating property. Use of such an electron-donating substance as a catalyst component together with a noble metal, in a catalyst allows the resulting catalyst to have improved low-temperature light-off performance. The reason for improvement in low-temperature light-off performance by use of an electron-donating substance is explained as follows.

When a catalyst comprises a carrier and a noble metal supported thereon and comprises no electron-donating substance, the noble metal is covered at the surface with the CO, HC, etc. present in the exhaust gas discharged from an automobile engine, at low-temperatures (e.g. during the cold start). As a result, $O_2$ is unable to contact with the noble metal and there takes place substantially no purification reaction (oxidation reaction) of CO and HC. As the temperature of the noble metal rises owing to the heat of exhaust gas, etc., the covering of the noble metal surface with CO and HC is weakened owing to the thermal vibration or energy of the noble metal; $O_2$ contact with the noble metal becomes possible; and a purification reaction of CO and HC is started.

In contrast, when an electron-donating substance is present close to the noble metal, electrons are donated to the noble metal from the electron-donating substance. As a result, the bonding of the noble metal with CO and HC is weakened; $O_2$ can contact the noble metal easily; and a purification reaction takes place at relatively low temperatures.

In the catalyst for exhaust gas purification according to the present invention, the catalyst layer requisitely contains Ba and Cs as electron-donating substances. Ba was selected as an electron-donating substance because Ba has a high electron-donatability, is highly heat-resistant and is low in vaporization even when subjected to a high-temperature exhaust gas.

Cs was selected as another electron-donating substance because (1) Cs has a higher electron-donatability than Ba and (2) use of Cs in catalyst layer, as compared with use of only Ba, can exhibit improved low-temperature light-off performance. When only Cs is used as an electron-donating substance in a catalyst layer, the resulting catalyst shows excellent low-temperature light-off performance when the catalyst is fresh. However, the catalyst loses, during the use, the performance to a level close to that of a catalyst containing no electron-donating substance, because Cs is low in heat resistance and vaporizes at high temperatures of about 500° C.

A study by the present inventors revealed that when Cs is used in combination with Ba, the effect of Cs remains even during the use of the catalyst at high temperatures. The reason is not clear but is presumed to be that Cs and Ba in catalyst layer form a compound oxide and thereby Cs is converted into a durable form. Therefore, it is desirable to produce a catalyst layer in such a manner that Cs and Ba can form a compound oxide easily.

In the present catalyst for exhaust gas purification, the catalyst layer contains at least one kind of noble metal together with Ba and Cs. The noble metal is preferably selected from Pd, Pt and Rh. Of them, Pd is particularly preferable because Pd is inexpensive, has high heat resistance, possesses high purification ability for HC and CO, shows improved low-temperature light-off performance in combination with Ba and Cs and, thereby, exhibits high purification ability in a fuel-rich atmosphere such as seen during the cold start of engine.

The catalyst for exhaust gas purification according to the present invention is constituted by a carrier and a catalyst layer containing the above-mentioned noble metal, Ba and Cs, formed on the carrier. The carrier has no particular restriction as to the kind, and there can be used various carriers such as monolithic carrier, pellets, beads, rings and the like. Of these, a monolithic carrier is most preferred.

The monolithic carrier refers to a structure having a large number of passages divided by partition walls and is generally called a honeycomb structure. Suitable as the material for the monolithic carrier are ceramic materials such as cordierite, mullite and the like; foil-shaped metallic materials made of heat-resistant stainless steel such as Fe—Cr—Al alloy or the like; and metallic materials molded into a honeycomb structure by powder metallurgy.

The passage shape (cell shape) of the monolithic carrier may be any of circular, polygonal, corrugated, etc. The external form of the monolithic carrier can be any as long as it is suited for the internal form of an exhaust gas system in which the present catalyst is provided. The cell density of the monolithic carrier is not particularly restricted but is preferably 6–1,500 cells/in.$^2$ (Cpi$^2$) (0.9–233 cells/cm$^2$). The partition wall thickness of the monolithic carrier is preferably 50–2,000 µm.

The monolithic carrier may be porous or non-porous and there is no restriction as to the porosity. However, the porosity is preferably 0–50%, more preferably 5–25% in view of the strength, oxidation resistance, corrosion resistance and adhesivity to catalyst layer. It is possible to use a monolithic carrier provided with electrodes for electrification, i.e. a honeycomb heater.

Formation of a catalyst layer on the monolithic carrier is usually conducted by coating, on a monolithic carrier, a slurry containing the components of the catalyst layer. The slurry used for formation of the catalyst layer, preferably has a pH of 10 or more. The reason is not clear, but it has been found out that a catalyst layer formed with a slurry having a pH of 10 or more, as compared with when using a slurry having a pH of less than 10, gives a catalyst of high purification ability.

In the catalyst for exhaust gas purification according to the present invention, the amount of noble metal contained in catalyst layer is, when the carrier is a monolithic carrier, preferably 10–700 g per ft$^3$ of monolithic carrier (3.53×10$^{-4}$ to 2.47×10$^{-2}$ g per cc of monolithic carrier), more preferably 30–250 g per ft$^3$ (1.06×10$^{-3}$ to 8.83×10$^{-3}$ g per cc). When the amount of noble metal supported is less than 10 g per ft$^3$ (3.53×10$^{-4}$ g per cc), the absolute amount of noble metal is insufficient for the HC discharged during the cold start of engine, resulting in insufficient HC purification. Meanwhile, when the amount of noble metal supported is more than 700 g per ft$^3$ (2.47×10$^{-2}$ g per cc), the distance between noble metal molecules is small and the noble metal tends to cause cohesion, resulting in reduced purification by noble metal.

When the noble metal in catalyst layer is Pd, the amount of Pd supported on monolithic carrier is preferably 100–300 g/ft$^3$ (3.53×10$^{-3}$ to 1.06×10$^{-2}$ g/cc), more preferably 140–240 g/ft$^3$ (4.94×10$^{-3}$ to 8.47×10$^{-3}$ g/cc), further preferably 160–220 g/ft$^3$ (5.65×10$^{-3}$ to 7.77×10$^{-3}$ g/cc). When the amount of Pd supported is less than 100 g/ft$^3$ (3.53×10$^{-3}$ g/cc), the HC purification during cold start is insufficient. When the amount of Pd supported is more than 300 g/ft$^3$ (1.06×10$^{-2}$ g/cc), Pd tends to cause cohesion, resulting in reduced purification by Pd.

The amount of Ba supported is, when the carrier used is a monolithic carrier, preferably 0.010–0.060 g per cc of monolithic carrier, more preferably 0.015–0.045 g per cc, in terms of BaO. When the amount of Ba supported is less than 0.010 g per cc in terms of BaO, the electron-donating effect of Ba is insufficient. When the amount is more than 0.060 g per cc, the catalyst easily undergoes thermal deterioration owing to the sintering, resulting in inferior durability of the catalyst.

In the present invention, the weight ratio of Cs and Ba both supported on catalyst is preferably 1:0.5 to 1:70, more preferably 1:1 to 1:10, further preferably 1:1 to 1:8 in terms of weight ratio of Cs$_2$O:BaO. Even if the weight of Cs$_2$O supported is larger than two times the weight of Ba supported, no further improvement in purification ability is obtained because excessive Cs$_2$O vaporizes at high temperatures, and use of Cs in excess invites unnecessary cost increase. Meanwhile, when the weight of Cs$_2$O supported is smaller than 1/70 of the weight of BaO supported, there is obtained little effect by Cs addition.

The catalyst layer may contain a heat-resistant inorganic oxide having a large specific surface area, as a substrate for supporting a noble metal, Ba and Cs in a highly dispersed state. The substrate is preferably active alumina, zirconia, silica, titania, zeolite or the like. Of these, active alumina having a specific surface area of 50 m$^2$/g or more is particularly preferable. By supporting a noble metal on active alumina of high specific surface area, the noble metal can be supported in a highly dispersed state and, moreover, can have a large contact area with exhaust gas.

The thickness of the catalyst layer formed on the monolithic carrier is preferably 10–150 µm. When the thickness is smaller than 10 µm, the resulting catalyst has a problem in durability. When the thickness is larger than 150 µm, the diffusion of exhaust gas deep into the inner part of the catalyst layer is difficult and the inner part of the catalyst layer is not effectively utilized.

When, in the catalyst layer, the noble metal, Ba and Cs are supported on a heat-resistant inorganic oxide (e.g. active alumina) which is a substrate and when part of the noble metal has no direct contact with the heat-resistant inorganic oxide and is supported on Ba and Cs (actually, Ba and Cs are present in the form of respective oxides or a compound oxide) supported on the heat-resistant inorganic oxide, the nobel metal tends to cause sintering and cohesion; as a result, the surface area of noble metal effective for purification decreases; and the deterioration of catalyst performance is invited at a relatively early timing.

In order to prevent such deterioration of catalyst performance, it is preferable that the noble metal is supported on the heat-resistant inorganic oxide in direct contact with the inorganic oxide. The noble metal supported on the heat-resistant inorganic oxide in direct contact therewith, as compared with the noble metal supported on Ba and Cs both supported on the inorganic oxide, is not liable to cause cohesion, can maintain its highly dispersed state over a long period of time, and promises excellent durability. This is presumed to be because the bonding between the noble metal and the heat-resistant inorganic oxide is stronger than that between the noble metal and Ba or Cs. Direct contact of the noble metal with the heat-resistant inorganic oxide can be attained by, in the production process of the catalyst layer, supporting the noble metal on the heat-resistant inorganic oxide prior to the supporting of Ba and Cs, and then supporting Ba and Cs on the noble metal-supported heat-resistant inorganic oxide.

In the present catalyst, a catalyst layer containing a noble metal, Ba and Cs and a catalyst layer containing the noble metal (and containing neither Ba nor Cs) may be formed on two respective monolithic carriers, or on one same monolithic carrier apart.

Or, the above two catalyst layers may be formed in two laminated layers on one same monolithic carrier. In that case, the lamination order of the two catalyst layers is not restricted; that is, any of the layer containing a noble metal, Ba and Cs and the layer containing the noble metal (and containing neither Ba nor Cs) may be at the upper (surface) side. However, when the layer containing the noble metal contains Rh, it is preferable for effective utilization of expensive Rh that the catalyst layer containing a noble metal, Ba and Cs is first formed and then the catalyst layer containing Rh is formed thereon, because this allows easy contact of Rh with exhaust gas.

In the present invention, it is also possible that a plurality of catalyst layers each containing a noble metal, Ba and Cs are formed on respective monolithic carriers, or on the same monolithic carrier apart in the flow direction of exhaust gas, or on the same monolithic carrier in a plurality of laminated layers.

In the present invention, it is also possible that the catalyst layer contains a rare earth element oxide (e.g. $CeO_2$ or $La_2O_3$) having oxygen storability and releasability. By adding a rare earth element oxide, the resulting catalyst can have a wider operational range of three-way catalyst and the three-way purifiability during the steady-state operation of the engine is enhanced. Further, the catalyst layer may contain Zr from the standpoint of improvement in heat resistance of heat-resistant inorganic oxide (e.g. active alumina) or in improvement of oxygen storability and releasability of $CeO_2$ or the like, although Zr makes no particular contribution to the improvement in low-temperature light-off performance as intended by the present invention.

The catalyst for exhaust gas purification according to the present invention is effective particularly for the purification of low-temperature exhaust gas of fuel-rich composition and is suitable for the purification of the harmful substances present in the exhaust gas discharged from an internal combustion engine during the cold start.

Next, description is made of examples of the method for production of the present catalyst for exhaust gas purification. The production method is divided mainly into the following two methods, i.e. impregnation method and predoping method, depending upon the mode of supporting a noble metal and electron-donating substances (Ba and Cs). As to supporting of the noble metal, the predoping method is preferred because the predoping method gives superior durability than the impregnation method.

Impregnation method

On a carrier is supported active alumina which is a substrate for supporting a noble metal and electron-donating substances (Ba and Cs) thereon in a highly dispersed state. The resulting material is fired to produce an alumina-supported carrier. The alumina-supported carrier is dipped in a solution in which a noble metal and electron-donating substances are dissolved, to support the noble metal and the electron-donating substances on the alumina. The resulting material is dried and fired. To achieve the above-mentioned direct contact of the noble metal with alumina, it is preferable that (1) the alumina-supported carrier is dipped first in a solution in which the noble metal is dissolved, then (2) the resulting noble metal-supported alumina-supported carrier is dipped in a solution in which the electron-donating substances are dissolved, and (3) the resulting material is dried and fired.

Predoping method

On an active alumina powder as substrate is supported a noble metal and electron-donating substances. The resulting noble metal and electron-donating substances-supported alumina powder is supported on a carrier. The resulting material is fired. When the noble metal and the electron-donating substances are supported on the same active alumina powder, in order to achieve the above-mentioned direct contact of the noble metal with the active alumina powder, it is preferable that the noble metal is first supported on the active alumina powder and then the electron-donating substances are supported on the resulting noble metal-supported active alumina powder.

Next, description is made on the system for exhaust gas purification according to the present invention. As mentioned previously, the present catalyst for exhaust gas purification is superior in low-temperature light-off performance and therefore exhibits early activation and high purification ability during the cold start of engine. When this catalyst is combined with an adsorbent having HC adsorbability and the combination is provided in the exhaust pipe of internal combustion engine as a system for exhaust gas purification, the HC discharged from the engine is adsorbed on the adsorbent during the period from the cold start of engine to the activation of catalyst, whereby a higher purification effect is obtained.

In this system for exhaust gas purification, the adsorbent used in combination with the catalyst is preferably one obtained by forming, by coating, an adsorbent layer made of a HC-adsorbable substance, on a carrier such as monolithic carrier or the like. The HC-adsorbable substance includes zeolite, active carbon, etc. Since the HC-adsorbable substance must be heat-resistant at temperatures of at least 500° C. for use in the exhaust pipe of internal combustion engine, the HC-adsorbable substance is preferably composed mainly of zeolite, SAPO (silicoaluminophosphate), AlPO (aluminophosphate) or the like. An HC-adsorbable substance mainly composed of zeolite is particularly preferred.

Zeolite may be any of a natural product and a synthetic product and has no particular restriction as to the kind. However, zeolite is preferably one having a $SiO_2/Al_2O_3$ molar ratio of 40 or more, more preferably one having a $SiO_2/Al_2O_3$ molar ratio of 80 or more, in view of the heat resistance, durability and hydrophobicity. Preferable specific examples of zeolite are ZSM-5, USY, β-zeolite, silicalite and metallosilicate.

Zeolite can be used in one kind or in combination of two or more kinds. Combined use of a plurality of zeolites different in pore diameters is preferable because it allows adsorption of various hydrocarbons of different molecular sizes ranging from ethylene, propene, etc. (small molecules) to toluene, xylene, etc. (large molecules). The plurality of zeolites may be present in the adsorbent layer in a mixed state, or may be provided in laminated layers. Or, the plurality of zeolites may be supported on the same carrier apart in the flow direction of exhaust gas. For example, two zeolites may be supported on one same monolithic carrier apart at two sites (upstream and downstream sites) of the carrier, or on respective carriers.

Zeolite may be used as it is. However, in order to suppress coking appearing during the adsorption of HC, etc., it is preferred that at least one noble metal selected from Pt, Pd, Rh, etc. is supported on zeolite. Thereby, zeolite can be regenerated without reducing its adsorbability. As the noble metal supported on zeolite, Pd is preferred because it is most inexpensive and allows efficient regeneration of zeolite. The supporting of noble metal on zeolite, when supporting is made directly on zeolite, is preferably conducted by ion exchange method, in view of the thermal stability. Even when a noble metal is supported on an inorganic oxide such as active alumina or the like and the noble metal-supported inorganic oxide is mixed with zeolite, the regeneratability of zeolite is sufficient. This latter approach is preferred because the resulting adsorbent layer has even a catalytic activity. It is also possible that an adsorbent layer made of zeolite is coated with the above-mentioned noble metal-supported inorganic oxide so that the resulting adsorbent has even a catalytic activity. (Hereinafter, such an adsorbent having even a catalytic activity is called "adsorbent-catalyst".)

It is also preferred to allow zeolite to contain at least one of the ions of Cu, Ag and Au (the group IB elements) because zeolite can have improved HC adsorbability thereby. In that case, since a lower content of the ion results in lower improvement in HC adsorbability, the content of the ion is preferably 20% or more based on the Al atoms of zeolite, more preferably 40% or more.

The carrier for supporting the adsorbent layer composed mainly of zeolite or the like has no particular restriction as to the form, and there can be used carriers of various forms such as monolithic carrier, pellets, beads, rings and the like. Of these, a monolithic carrier is most preferred.

In the system for exhaust gas purification according to the present invention, it is preferred that the adsorbent is provided upstream of the catalyst in the flow direction of exhaust gas. In the present system, the adsorbent adsorbs HC, etc. present in the exhaust gas discharged during the cold start of internal combustion engine and the adsorbate is desorbed from the adsorbent with the temperature increase of the adsorbent caused by the heat of exhaust gas. Therefore, by providing the catalyst downstream of the adsorbent in the flow direction of exhaust gas, the purification efficiency for the HC, etc. discharged during the cold start can be increased remarkably.

In the present purification system, the HC, etc. adsorbed on the adsorbent is desorbed therefrom with the temperature increase of the adsorbent and purified by the catalyst. As mentioned previously, the catalyst of the present invention, as compared with conventional catalysts, is activated at low temperatures owing to the reaction mechanism involving electron donation; therefore, between the temperature at which HC desorption from the adsorbent starts and the temperature at which the catalyst is activated, the difference is small and, as a result, the HC discharged in a large amount during the cold start can be purified effectively.

In the present exhaust gas purification system, a plurality of the catalysts of the present invention each having excellent low-temperature light-off performance may be used. For example, when each one catalyst of the present invention is provided upstream and downstream of the adsorbent, the HC discharged prior to the activation of the upstream catalyst is adsorbed by the adsorbent, then desorbed, and purified by the downstream catalyst; after the upstream catalyst has been activated, purification is conducted also by the upstream catalyst.

As mentioned previously, the exhaust gas purification catalyst and the exhaust gas purification system both according to the present invention exhibit high purification abilities during the cold start of internal combustion engine. In order to further increase the purification abilities during the cold start or to increase the purification abilities during the steady-state operation of the engine, it is possible to additionally provide a different catalyst in the exhaust pipe of engine. When a different catalyst is provided, for example, downstream of the exhaust gas purification catalyst of the present invention, the different catalyst is heated by the reaction heat generated in the present exhaust gas purification catalyst which is activated at an early timing of cold start and, as a result, can reach its operating temperature earlier than usual. The different catalyst preferably contains Pd as a catalyst active component.

In conducting exhaust gas purification during the cold start of the engine by using the exhaust gas purification catalyst or the exhaust gas purification system both according to the present invention, when, for a certain period of cold start, an oxidizing gas (e.g. secondary air) is introduced into the exhaust gas at a site of the exhaust pipe upstream of the catalyst in the flow direction of exhaust gas, or the ratio of air (for combustion) amount and fuel amount is controlled so that the oxygen amount in the exhaust gas is increased, the combustion reaction of catalyst is promoted and the early activation of catalyst is achieved. In the present exhaust gas purification system using an adsorbent, as the HC adsorbed on the adsorbent begins to be desorbed with the temperature increase of the adsorbent caused by the heat of exhaust gas, the HC concentration in exhaust gas increases and the oxygen required for purification (combustion) of HC becomes insufficient; hence, the above-mentioned introduction of oxidizing gas or control of the ratio of air amount and fuel amount is preferred for making-up of oxygen.

EXAMPLES

The present invention is hereinafter described in more detail by way of Examples. However, the present invention is not restricted to these Examples.

Production of catalysts (Catalyst 1)

An aqueous palladium nitrate solution and an appropriate amount of acetic acid were added to commercial γ-$Al_2O_3$, and they were pulverized in a ball mill for 15 hours. The resulting slurry was dried at 100° C. for 15 hours, pulverized, and fired at 550° C. for 3 hours to obtain a Pd-predoped $Al_2O_3$ powder. The Pd-predoped $Al_2O_3$ powder was mixed with an appropriate amount of water. Thereto were added an appropriate amount of acetic acid and an alumina sol having an alumina solid content of 2.5%. The resulting mixture was pulverized in a ball mill for 15 hours to produce a slurry (pH 4). In the slurry was dipped a monolithic carrier (a cordierite honeycomb manufactured by NGK Insulators, Ltd. having a diameter of 93 mm and a length of 100 mm) to support, on the carrier, Pd and $Al_2O_3$ in amounts of Pd=200 $g/ft^3$ ($7.06 \times 10^{-3}$ g/cc) and $Al_2O_3$= 0.065 g/cc. The resulting material was subjected to a drying step and a firing step to produce catalyst 1.

(Catalyst 2)

An aqueous platinum chloride solution and an appropriate amount of acetic acid were added to commercial $\gamma$-$Al_2O_3$, and they were pulverized in a ball mill for 15 hours. The resulting slurry was dried at 100° C. for 15 hours, pulverized, and fired at 550° C. for 3 hours to obtain a Pt-predoped $Al_2O_3$ powder. To the Pt-predoped $Al_2O_3$ powder was added an appropriate amount of water. Thereto were added an appropriate amount of acetic acid and an alumina sol having an alumina solid content of 2.5%. The resulting mixture was pulverized in a ball mill for 15 hours to produce a slurry (pH 4). In the slurry was dipped a monolithic carrier (a cordierite honeycomb manufactured by NGK Insulators, Ltd. having a diameter of 93 mm and a length of 100 mm) to support, on the carrier, Pt and $Al_2O_3$ in amounts of Pt=50 $g/ft^3$ ($1.77 \times 10^{-3}$ g/cc) and $Al_2O_3$=0.065 g/cc. The resulting material was subjected to a drying step and a firing step to produce catalyst 2.

(Catalyst 3)

An aqueous rhodium nitrate solution and an appropriate amount of acetic acid were added to commercial $\gamma$-$Al_2O_3$, and they were pulverized in a ball mill for 15 hours. The resulting slurry was dried at 100° C. for 15 hours, pulverized, and fired at 550° C. for 3 hours to obtain a Rh-predoped $Al_2O_3$ powder. To the Rh-predoped $Al_2O_3$ powder was added an appropriate amount of water. Thereto were added an appropriate amount of acetic acid and an alumina sol having an alumina solid content of 2.5%. The resulting mixture was pulverized in a ball mill for 15 hours to produce a slurry (pH 4). In the slurry was dipped a monolithic carrier (a cordierite honeycomb manufactured by NGK Insulators, Ltd. having a diameter of 93 mm and a length of 100 mm) to support, on the carrier, Rh and $Al_2O_3$ in amounts of Rh=10 $g/ft^3$ ($3.53 \times 10^{-4}$ g/cc) and $Al_2O_3$= 0.065 g/cc. The resulting material was subjected to a drying step and a firing step to produce catalyst 3.

(Catalyst 4)

An aqueous palladium nitrate solution and an appropriate amount of acetic acid were added to commercial $\gamma$-$Al_2O_3$, and they were pulverized in a ball mill for 15 hours. The resulting slurry was dried at 100° C. for 15 hours, pulverized, and fired at 550° C. for 3 hours to obtain a Pd-predoped $Al_2O_3$ powder. The Pd-predoped $Al_2O_3$ powder was impregnated with an aqueous barium nitrate solution and an appropriate amount of acetic acid, followed by pulverization in a ball mill for 15 hours. The resulting slurry was dried at 100° C. for 15 hours, pulverized, and fired at 700° C. for 3 hours to obtain a Pd/Ba-predoped $Al_2O_3$ powder.

The Pd/Ba-predoped $Al_2O_3$ powder was mixed with an appropriate amount of water. Thereto were added an appropriate amount of acetic acid and an alumina sol having an alumina solid content of 2.5%. The resulting mixture was pulverized in a ball mill for 15 hours to produce a slurry (pH 10). In the slurry was dipped a monolithic carrier (a cordierite honeycomb manufactured by NGK Insulators, Ltd. having a diameter of 93 mm and a length of 100 mm) to support, on the carrier, Pd, Ba and $Al_2O_3$ in amounts of Pd=200 $g/ft^3$ ($7.06 \times 10^{-3}$ g/cc), BaO=0.04 g/cc and $Al_2O_3$= 0.065 g/cc. The resulting material was subjected to a drying step and a firing step to produce catalyst 4.

(Catalyst 5)

Catalyst 5 was produced in the same manner as in the case of the catalyst 4 except that the aqueous barium nitrate solution was changed to an aqueous cesium nitrate solution. In the catalyst 5, Pd, Cs and $Al_2O_3$ were supported on the monolithic carrier in amounts of Pd=200 $g/ft^3$ ($7.06 \times 10^{-3}$ g/cc), $Cs_2O$=0.04 g/cc and $Al_2O_3$=0.065 g/cc.

(Catalyst 6)

An aqueous palladium nitrate solution and an appropriate amount of acetic acid were added to commercial $\gamma$-$Al_2O_3$, and they were pulverized in a ball mill for 15 hours. The resulting slurry was dried at 100° C. for 15 hours, pulverized, and fired at 550° C. for 3 hours to obtain a Pd-predoped $Al_2O_3$ powder. The Pd-predoped $Al_2O_3$ powder was impregnated with an aqueous barium nitrate solution, an aqueous cesium nitrate solution and an appropriate amount of acetic acid, followed by pulverization in a ball mill for 15 hours. The resulting slurry was dried at 100° C. for 15 hours, pulverized, and fired at 700° C. for 3 hours to obtain a Pd/Ba/Cs-predoped $Al_2O_3$ powder.

The Pd/Ba/Cs-predoped $Al_2O_3$ powder was mixed with an appropriate amount of water. Thereto were added an appropriate amount of acetic acid and an alumina sol having an alumina solid content of 2.5%. The resulting mixture was pulverized in a ball mill for 15 hours to produce a slurry (pH 10). In the slurry was dipped a monolithic carrier (a cordierite honeycomb manufactured by NGK Insulators, Ltd. having a diameter of 93 mm and a length of 100 mm) to support, on the carrier, Pd, Ba and $Al_2O_3$ in amounts of Pd=200 $g/ft^3$ ($7.06 \times 10^{-3}$ g/cc), BaO=0.04 g/cc, $Cs_2O$=0.01 g/cc and $Al_2O_3$=0.065 g/cc. The resulting material was subjected to a drying step and a firing step to produce catalyst 6.

(Catalyst 7)

Catalyst 7 was produced in the same manner as in the case of the catalyst 6 except that the aqueous palladium nitrate solution was changed to an aqueous platinum chloride solution. In the catalyst 7, Pt, Ba, Cs and $Al_2O_3$ were supported on the monolithic carrier in amounts of Pt=50 $g/ft^3$ ($1.77 \times 10^{-3}$ g/cc), BaO=0.04 g/cc, $Cs_2O$=0.01 g/cc and $Al_2O_3$=0.065 g/cc.

(Catalyst 8)

Catalyst 8 was produced in the same manner as in the case of the catalyst 6 except that the aqueous palladium nitrate solution was changed to an aqueous rhodium nitrate solution. In the catalyst 8, Rh, Ba, Cs and $Al_2O_3$ were supported on the monolithic carrier in amounts of Rh=10 $g/ft^3$ ($3.53 \times 10^{-4}$ g/cc), BaO=0.04 g/cc, $Cs_2O$=0.01 g/cc and $Al_2O_3$= 0.065 g/cc.

(Catalyst 9)

An aqueous palladium nitrate solution and an appropriate amount of acetic acid were added to commercial $\gamma$-$Al_2O_3$, and they were pulverized in a ball mill for 15 hours. The resulting slurry was dried at 100° C. for 15 hours, pulverized, and fired at 550° C. for 3 hours to obtain a Pd-predoped $Al_2O_3$ powder. The Pd-predoped $Al_2O_3$ powder was impregnated with an aqueous cesium nitrate solution and an appropriate amount of acetic acid, followed by pulverization in a ball mill for 15 hours. The resulting slurry was dried at 100° C. for 15 hours, pulverized, and fired at 500° C. for 3 hours to obtain a Pd/Cs-predoped $Al_2O_3$ powder. The Pd/Cs-predoped $Al_2O_3$ powder was impregnated with an aqueous barium nitrate solution and an appropriate amount of acetic acid, followed by pulverization in a ball mill for 15 hours. The resulting slurry was dried at 100° C. for 15 hours, pulverized, and fired at 700° C. for 3 hours to obtain a Pd/Ba/Cs-predoped $Al_2O_3$ powder.

The Pd/Ba/Cs-predoped $Al_2O_3$ powder was mixed with an appropriate amount of water. Thereto were added an appropriate amount of acetic acid and an alumina sol having an alumina solid content of 2.5%. The resulting mixture was pulverized in a ball mill for 15 hours to produce a slurry (pH 10). In the slurry was dipped a monolithic carrier (a cordierite honeycomb manufactured by NGK Insulators, Ltd. having a diameter of 93 mm and a length of 100 mm) to support, on the carrier, Pd, Ba, Cs and $Al_2O_3$ in amounts of Pd=200 g/ft³ ($7.06\times10^{-3}$ g/cc), BaO=0.04 g/cc, $Cs_2O$=0.01 g/cc and $Al_2O_3$=0.065 g/cc. The resulting material was subjected to a drying step and a firing step to produce catalyst 9.

(Catalyst 10)

An aqueous barium nitrate solution, an aqueous cesium nitrate solution and an appropriate amount of acetic acid were added to commercial γ-$Al_2O_3$, and they were pulverized in a ball mill for 15 hours. The resulting slurry was dried at 100° C. for 15 hours, pulverized, and fired at 700° C. for 3 hours to obtain a Ba/Cs-predoped $Al_2O_3$ powder. The Ba/Cs-predoped $Al_2O_3$ powder was impregnated with an aqueous palladium nitrate solution and an appropriate amount of acetic acid, followed by pulverization in a ball mill for 15 hours. The resulting slurry was dried at 100° C. for 15 hours, pulverized, and fired at 550° C. for 3 hours to obtain a Pd/Ba/Cs-predoped $Al_2O_3$ powder.

The Pd/Ba/Cs-predoped $Al_2O_3$ powder was mixed with an appropriate amount of water. Thereto were added an appropriate amount of acetic acid and an alumina sol having an alumina solid content of 2.5%. The resulting mixture was pulverized in a ball mill for 15 hours to produce a slurry (pH 10). In the slurry was dipped a monolithic carrier (a cordierite honeycomb manufactured by NGK Insulators, Ltd. having a diameter of 93 mm and a length of 100 mm) to support, on the carrier, Pd, Ba, Cs and $Al_2O_3$ in amounts of Pd=200 g/ft³ ($7.06\times10^{-3}$ g/cc), BaO=0.04 g/cc, $Cs_2O$=0.01 g/cc and $Al_2O_3$=0.065 g/cc. The resulting material was subjected to a drying step and a firing step to produce catalyst 10.

(Catalyst 11)

An aqueous palladium nitrate solution, an aqueous barium nitrate solution, an aqueous cesium nitrate solution and an appropriate amount of acetic acid were added to commercial γ-$Al_2O_3$, and they were pulverized in a ball mill for 15 hours. The resulting slurry was dried at 100° C. for 15 hours, pulverized, and fired at 700° C. for 3 hours to obtain a Pd/Ba/Cs-predoped $Al_2O_3$ powder. The Pd/Ba/Cs-predoped $Al_2O_3$ powder was mixed with an appropriate amount of water. Thereto were added an appropriate amount of acetic acid and an alumina sol having an alumina solid content of 2.5%. The resulting mixture was pulverized in a ball mill for 15 hours to produce a slurry (pH 10). In the slurry was dipped a monolithic carrier (a cordierite honeycomb manufactured by NGK Insulators, Ltd. having a diameter of 93 mm and a length of 100 mm) to support, on the carrier, Pd, Ba, Cs and $Al_2O_3$ in amounts of Pd=200 g/ft³ ($7.06\times10^{-3}$ g/cc), BaO=0.04 g/cc, $Cs_2O$=0.01 g/cc and $Al_2O_3$=0.065 g/cc. The resulting material was subjected to a drying step and a firing step to produce catalyst 11.

(Catalyst 12)

An aqueous palladium nitrate solution and an appropriate amount of acetic acid were added to commercial γ-$Al_2O_3$, and they were pulverized in a ball mill for 15 hours. The resulting slurry was dried at 100° C. for 15 hours, pulverized, and fired at 550° C. for 3 hours to obtain a Pd-predoped $Al_2O_3$ powder. Separately, an aqueous cesium nitrate solution was mixed with barium oxide particles, and the mixture was dried, pulverized and fired at 700° C. for 3 hours to obtain a Cs-predoped BaO powder. The Pd-predoped $Al_2O_3$ powder, the Cs-predoped BaO powder and an appropriate amount of water were mixed; the mixture was mixed as necessary with an alumina sol having an alumina solid content of 2.5%; the resulting mixture was pulverized in a ball mill for 15 hours to obtain a slurry (pH 10). In the slurry was dipped a monolithic carrier (a cordierite honeycomb manufactured by NGK Insulators, Ltd. having a diameter of 93 mm and a length of 100 mm) to support, on the carrier, Pd, Ba, Cs and $Al_2O_3$ in amounts of Pd=200 g/ft³ ($7.06\times10^{-3}$ g/cc), BaO=0.04 g/cc, $Cs_2O$=0.01 g/cc and $Al_2O_3$=0.065 g/cc. The resulting material was subjected to a drying step and a firing step to produce catalyst 12.

(Catalyst 13)

Catalyst 13 was produced in the same manner as in the case of the catalyst 6 except that the aqueous barium nitrate solution was changed to an aqueous barium hydroxide solution.

(Catalyst 14)

The catalyst 1 was dipped in an aqueous solution containing barium nitrate and cesium nitrate, to support, on the carrier, Pd, Ba, Cs and $Al_2O_3$ in amounts of Pd=200 g/ft³ ($7.06\times10^{-3}$ g/cc), BaO=0.04 g/cc, $Cs_2O$=0.01 g/cc and $Al_2O_3$=0.065 g/cc. The resulting material was subjected to a drying step and a firing step to produce catalyst 14.

(Catalyst 15)

An aqueous palladium nitrate solution and an appropriate amount of acetic acid were added to commercial γ-$Al_2O_3$, and they were pulverized in a ball mill for 15 hours. The resulting slurry was dried at 100° C. for 15 hours, pulverized, and fired at 550° C. for 3 hours to obtain a Pd-predoped $Al_2O_3$ powder. The Pd-predoped $Al_2O_3$ powder was impregnated with an aqueous barium nitrate solution, an aqueous cesium nitrate solution and an appropriate amount of acetic acid. The resulting material was pulverized in a ball mill for 15 hours. The resulting slurry was dried at 100° C. for 15 hours, pulverized and fired at 700° C. for 3 hours to obtain a Pd/Ba/Cs-predoped $Al_2O_3$ powder.

The Pd/Ba/Cs-predoped $Al_2O_3$ powder was mixed with an appropriate amount of water. Thereto were added an appropriate amount of acetic acid and an alumina sol having an alumina solid content of 2.5%. The resulting mixture was pulverized in a ball mill for 15 hours to obtain a slurry (pH 4). In the slurry was dipped a monolithic carrier (a cordierite honeycomb manufactured by NGK Insulators, Ltd. having a diameter of 93 mm and a length of 100 mm) to support, on the carrier, Pd, Ba, Cs and $Al_2O_3$ in amounts of Pd=200 g/ft³ ($7.06\times10^{-3}$ g/cc), BaO=0.04 g/cc, $Cs_2O$=0.01 g/cc and $Al_2O_3$=0.065 g/cc. The resulting material was subjected to a drying step and a firing step to produce catalyst 15.

(Catalyst 16)

An aqueous palladium nitrate solution and an appropriate amount of acetic acid were added to commercial γ-$Al_2O_3$, and they were pulverized in a ball mill for 15 hours. The resulting slurry was dried at 100° C. for 15 hours, pulverized, and fired at 550° C. for 3 hours to obtain a Pd-predoped $Al_2O_3$ powder. The Pd-predoped $Al_2O_3$ powder was impregnated with an aqueous barium nitrate solution, an aqueous cesium nitrate solution and an appropriate amount of acetic acid. The resulting material was pulverized in a ball mill for 15 hours. The resulting slurry was dried at 100° C. for 15 hours, pulverized and fired at 700° C. for 3 hours to obtain a Pd/Ba/Cs-predoped $Al_2O_3$ powder.

The Pd/Ba/Cs-predoped $Al_2O_3$ powder was mixed with $CeO_2$ particles and an appropriate amount of water. Thereto was added as necessary an alumina sol having an alumina solid content of 2.5%. The resulting mixture was pulverized in a ball mill for 15 hours to obtain a slurry (pH 10). In the slurry was dipped a monolithic carrier (a cordierite honeycomb manufactured by NGK Insulators, Ltd. having a diameter of 93 mm and a length of 100 mm) to support, on the carrier, Pd, Ba, Cs, $Al_2O_3$ and $CeO_2$ in amounts of Pd=200 g/ft$^3$ (7.06×10$^{-3}$ g/cc), BaO=0.04 g/cc, $Cs_2O$=0.01 g/cc, $Al_2O_3$=0.065 g/cc and $CeO_2$=0.03 g/cc. The resulting material was subjected to a drying step and a firing step to produce catalyst 16.

(Catalyst 17)

Catalyst 17 was produced in the same manner as in the case of the catalyst 6 except that the amount of Pd supported on monolithic carrier was changed to Pd=500 g/ft$^3$ (1.77×10$^{-2}$ g/cc).

(Catalyst 18)

Catalyst 18 was produced in the same manner as in the case of the catalyst 6 except that the amount of Pd supported on monolithic carrier was changed to Pd=50 g/ft$^3$ (1.77×10$^{-3}$ g/cc).

(Catalyst 19)

Catalyst 19 was produced in the same manner as in the case of the catalyst 6 except that the amount of Ba supported on monolithic carrier was changed to BaO=0.10 g/cc.

(Catalyst 20)

Catalyst 20 was produced in the same manner as in the case of the catalyst 6 except that the amount of Ba supported on monolithic carrier was changed to BaO=0.005 g/cc.

(Catalyst 21)

Catalyst 21 was produced in the same manner as in the case of the catalyst 6 except that the amount of Cs supported on monolithic carrier was changed to $Cs_2O$=0.005 g/cc.

(Catalyst 22)

Catalyst 22 was produced in the same manner as in the case of the catalyst 6 except that the amount of Cs supported on monolithic carrier was changed to $Cs_2O$=0.09 g/cc.

(Catalyst 23)

An aqueous rhodium nitrate solution and an appropriate amount of acetic acid were added to commercial γ-$Al_2O_3$, and they were pulverized in a ball mill for 15 hours. The resulting slurry was dried at 100° C. for 15 hours, pulverized, and fired at 550° C. for 3 hours to obtain a Rh-predoped $Al_2O_3$ powder. The Rh-predoped $Al_2O_3$ powder was mixed with an appropriate amount of water. Thereto were added an appropriate amount of acetic acid and an alumina sol having an alumina solid content of 2.5%. The resulting mixture was pulverized in a ball mill for 15 hours to obtain a slurry (pH 4). In the slurry was dipped the catalyst 6 to support, on the carrier, Rh, Pd, Ba, Cs and $Al_2O_3$ in amounts of Rh=10 g/ft$^3$ (3.53×10$^{-4}$ g/cc), Pd=200 g/ft$^3$ (7.06×10$^{-3}$ g/cc), BaO=0.04 g/cc, $Cs_2O$=0.01 g/cc and $Al_2O_3$=0.08 g/cc. The resulting material was subjected to a drying step and a firing step to produce catalyst 23.

(Catalyst 24)

An aqueous palladium nitrate solution and an appropriate amount of acetic acid were added to commercial γ-$Al_2O_3$, and they were pulverized in a ball mill for 15 hours. The resulting slurry was dried at 100° C. for 15 hours, pulverized, and fired at 550° C. for 3 hours to obtain a Pd-predoped $Al_2O_3$ powder. The Pd-predoped $Al_2O_3$ powder was impregnated with an aqueous barium nitrate solution, an aqueous cesium nitrate solution and an appropriate amount of acetic acid. The resulting material was pulverized in a ball mill for 15 hours. The resulting slurry was dried at 100° C. for 15 hours, pulverized and fired at 700° C. for 3 hours to obtain a Pd/Ba/Cs-predoped $Al_2O_3$ powder.

The Pd/Ba/Cs-predoped $Al_2O_3$ powder was mixed with an appropriate amount of water. Thereto were added an appropriate amount of acetic acid and an alumina sol having a solid alumina content of 2.5%. The resulting mixture was pulverized in a ball mill for 15 hours to obtain a slurry (pH 10). In the slurry was dipped a catalyst (produced in the same manner as in the case of the catalyst 3 except that the amount of $Al_2O_3$ supported was different) to support, on the carrier, Rh, Pd, Ba, Cs and $Al_2O_3$ in amounts of Rh=10 g/ft$^3$ (3.53×10$^{-4}$ g/cc), Pd=200 g/ft$^3$ (7.06×10$^{-3}$ g/cc), BaO=0.04 g/cc, $Cs_2O$=0.01 g/cc and $Al_2O_3$=0.08 g/cc. The resulting material was subjected to a drying step and a firing step to produce catalyst 24.

(Catalyst 25)

An aqueous rhodium nitrate solution and an appropriate amount of acetic acid were added to commercial γ-$Al_2O_3$, and they were pulverized in a ball mill for 15 hours. The resulting slurry was dried at 100° C. for 15 hours, pulverized, and fired at 550° C. for 3 hours to obtain a Rh-predoped $Al_2O_3$ powder. The Rh-predoped $Al_2O_3$ powder was mixed with an appropriate amount of water. Thereto were added an appropriate amount of acetic acid and an alumina sol having an alumina solid content of 2.5%. The resulting mixture was pulverized in a ball mill for 15 hours to produce a slurry (pH 4). In the slurry was dipped a monolithic carrier (a cordierite honeycomb manufactured by NGK Insulators, Ltd. having a diameter of 93 mm and a length of 100 mm) by the upper half in the lengthwise direction, to support, on the carrier, Rh and $Al_2O_3$ in required amounts. The resulting material was subjected to a drying step and a firing step to produce a carrier coated with Rh-supported $Al_2O_3$.

Separately, an aqueous palladium nitrate solution and an appropriate amount of acetic acid were added to commercial γ-$Al_2O_3$, and they were pulverized in a ball mill for 15 hours. The resulting slurry was dried at 100° C. for 15 hours, pulverized, and fired at 550° C. for 3 hours to obtain a Pd-predoped $Al_2O_3$ powder. The Pd-predoped $Al_2O_3$ powder was impregnated with an aqueous barium nitrate solution, an aqueous cesium nitrate solution and an appropriate amount of acetic acid. The resulting material was pulverized in a ball mill for 15 hours. The resulting slurry was dried at 100° C. for 15 hours, pulverized, and fired at 700° C. for 3 hours to obtain a Pd/Ba/Cs-predoped $Al_2O_3$ powder.

The Pd/Ba/Cs-predoped $Al_2O_3$ powder was mixed with an appropriate amount of water. Thereto were added an appropriate amount of acetic acid and an alumina sol having a solid alumina content of 2.5%. The resulting mixture was pulverized in a ball mill for 15 hours to obtain a slurry (pH 10). In the slurry was dipped the above-produced carrier coated with Rh-supported $Al_2O_3$, by the lower half in the lengthwise direction, to support, on the carrier, Rh, Pd, Ba, Cs and $Al_2O_3$ in amounts of Rh=10 g/ft$^3$ (3.53×10$^{-4}$ g/cc), Pd=200 g/ft$^3$ (7.06×10$^{-3}$ g/cc), BaO=0.04 g/cc, $Cs_2O$=0.01 g/cc and $Al_2O_3$=0.08 g/cc. The resulting material was subjected to a drying step and a firing step to produce catalyst 25.

(Catalyst 26)

An aqueous rhodium nitrate solution and an appropriate amount of acetic acid were added to commercial γ-$Al_2O_3$, and they were pulverized in a ball mill for 15 hours. The resulting slurry was dried at 100° C. for 15 hours, pulverized, and fired at 550° C. for 3 hours to obtain a Rh-predoped $Al_2O_3$ powder. The Rh-predoped $Al_2O_3$ powder was mixed with an appropriate amount of water. Thereto were added an appropriate amount of acetic acid and an alumina sol having an alumina solid content of 2.5%. The resulting mixture was pulverized in a ball mill for 15 hours to produce a slurry (pH 4). In the slurry was dipped a monolithic carrier (a cordierite honeycomb manufactured by NGK Insulators, Ltd. having a diameter of 93 mm and a length of 100 mm) by the inner cylindrical portion of the carrier having a 40 mm diameter and coaxial with the carrier, to support, on the carrier, Rh and $Al_2O_3$ in required amounts. The resulting material was subjected to a drying step and a firing step to produce a carrier coated with Rh-supported $Al_2O_3$.

Separately, an aqueous palladium nitrate solution and an appropriate amount of acetic acid were added to commercial γ-$Al_2O_3$, and they were pulverized in a ball mill for 15 hours. The resulting slurry was dried at 100° C. for 15 hours, pulverized, and fired at 550° C. for 3 hours to obtain a Pd-predoped $Al_2O_3$ powder. The Pd-predoped $Al_2O_3$ powder was impregnated with an aqueous barium nitrate solution, an aqueous cesium nitrate solution and an appropriate amount of acetic acid. The resulting material was pulverized in a ball mill for 15 hours. The resulting slurry was dried at 100° C. for 15 hours, pulverized, and fired at 700° C. for 3 hours to obtain a Pd/Ba/Cs-predoped $Al_2O_3$ powder.

The Pd/Ba/Cs-predoped $Al_2O_3$ powder was mixed with an appropriate amount of water. Thereto were added an appropriate amount of acetic acid and an alumina sol having a solid alumina content of 2.5%. The resulting mixture was pulverized in a ball mill for 15 hours to obtain a slurry (pH 10). In the slurry was dipped the above-produced carrier coated with Rh-supported $Al_2O_3$, by the remaining portion of the carrier (the carrier minus the above-mentioned inner cylindrical portion) to support, on the carrier, Rh, Pd, Ba, Cs and $Al_2O_3$ in amounts of Rh=10 g/ft$^3$ (3.53×10$^{-4}$ g/cc), Pd=200 g/ft$^3$ (7.06×10$^{-3}$ g/cc), BaO=0.04 g/cc, $Cs_2O$=0.01 g/cc and $Al_2O_3$=0.08 g/cc. The resulting material was subjected to a drying step and a firing step to produce catalyst 26.

(Catalyst 27)

An aqueous rhodium nitrate solution and an appropriate amount of acetic acid were added to commercial γ-$Al_2O_3$, and they were pulverized in a ball mill for 15 hours. The resulting slurry was dried at 100° C. for 15 hours, pulverized, and fired at 550° C. for 3 hours to obtain a Rh-predoped $Al_2O_3$ powder. Separately, an aqueous palladium nitrate solution and an appropriate amount of acetic acid were added to commercial γ-$Al_2O_3$, and they were pulverized in a ball mill for 15 hours. The resulting slurry was dried at 100° C. for 15 hours, pulverized, and fired at 550° C. for 3 hours to obtain a Pd-predoped $Al_2O_3$ powder. The Pd-predoped $Al_2O_3$ powder was impregnated with an aqueous barium nitrate solution, an aqueous cesium nitrate solution and an appropriate amount of acetic acid. The resulting material was pulverized in a ball mill for 15 hours. The resulting slurry was dried at 100° C. for 15 hours, pulverized, and fired at 700° C. for 3 hours to obtain a Pd/Ba/Cs-predoped $Al_2O_3$ powder.

There were mixed the Rh-predoped $Al_2O_3$ powder, the Pd/Ba/Cs-predoped $Al_2O_3$ powder and an appropriate amount of water. Thereto were added an appropriate amount of acetic acid and an alumina sol having a solid alumina content of 2.5%. The resulting mixture was pulverized in a ball mill for 15 hours to obtain a slurry (pH 10). In the slurry was dipped a monolithic carrier (a cordierite honeycomb manufactured by NGK Insulators, Ltd. having a diameter of 93 mm and a length of 100 mm) to support, on the carrier, Rh, Pd, Ba, Cs and $Al_2O_3$ in amounts of Rh=10 g/ft$^3$ (3.53×10$^{-4}$ g/cc), Pd=200 g/ft$^3$ (7.06×10$^{-3}$ g/cc), BaO=0.04 g/cc, $Cs_2O$=0.01 g/cc, $Al_2O_3$=0.08 g/cc. The resulting material was subjected to a drying step and a firing step to produce catalyst 27.

(Catalyst 28)

A catalyst was produced in the same manner as in the case of the catalyst 3 by dipping, in a slurry, a monolithic carrier (a cordierite honeycomb manufactured by NGK Insulators, Ltd. having a diameter of 93 mm and a length of 50 mm) to support, on the carrier, Rh and $Al_2O_3$ in amounts of Rh=10 g/ft$^3$ (3.53×10$^{-4}$ g/cc) and $Al_2O_3$=0.015 g/cc. Separately, a catalyst was produced in the same manner as in the case of the catalyst 6 by dipping, in a slurry, a monolithic carrier (a cordierite honeycomb manufactured by NGK Insulators, Ltd. having a diameter of 93 mm and a length of 50 mm) to support, on the carrier, Pd, Ba, Cs and $Al_2O_3$ in amounts of Pd=200 g/ft$^3$ (7.06×10$^{-3}$ g/cc), BaO=0.04 g/cc, $Cs_2O$=0.01 g/cc and $Al_2O_3$=0.065 g/cc. The two catalysts were combined by placing them in their lengthwise direction, to produce catalyst 28.

(Catalyst 29)

An aqueous rhodium nitrate solution and an appropriate amount of acetic acid were added to commercial γ-$Al_2O_3$, and they were pulverized in a ball mill for 15 hours. The resulting slurry was dried at 100° C. for 15 hours, pulverized, and fired at 550° C. for 3 hours to obtain a Rh-predoped $Al_2O_3$ powder. The Rh-predoped $Al_2O_3$ powder was mixed with an appropriate amount of water. Thereto were added an appropriate amount of acetic acid and an alumina sol having an alumina solid content of 2.5%. The resulting mixture was pulverized in a ball mill for 15 hours to produce a slurry (pH 4). In the slurry was dipped the catalyst 1 to support, on the carrier, Rh, Pd and $Al_2O_3$ in amounts of Rh=10 g/ft$^3$ (3.53×10$^{-4}$ g/cc), Pd=200 g/ft$^3$ (7.06×10$^{-3}$ g/cc) and $Al_2O_3$=0.08 g/cc. The resulting material was subjected to a drying step and a firing step to produce catalyst 29.

(Catalyst 30)

An aqueous palladium nitrate solution and an appropriate amount of acetic acid were added to commercial γ-$Al_2O_3$, and they were pulverized in a ball mill for 15 hours. The resulting slurry was dried at 100° C. for 15 hours, pulverized, and fired at 550° C. for 3 hours to obtain a Pd-predoped $Al_2O_3$ powder. The Pd-predoped $Al_2O_3$ powder was impregnated with an aqueous barium nitrate solution, an aqueous cesium nitrate solution and an appropriate amount of acetic acid. The resulting material was pulverized in a ball mill for 15 hours. The resulting slurry was dried at 100° C. for 15 hours, pulverized and fired at 700° C. for 3 hours to obtain a Pd/Ba/Cs-predoped $Al_2O_3$ powder.

The Pd/Ba/Cs-predoped $Al_2O_3$ powder was mixed with an appropriate amount of water. Thereto were added an appropriate amount of acetic acid and an alumina sol having a solid alumina content of 2.5%. The resulting mixture was pulverized in a ball mill for 15 hours to obtain a slurry (pH 10). In the slurry was dipped the catalyst 6 to support, on the carrier, Pd, Ba, Cs and $Al_2O_3$ in amounts of Pd=250 g/ft$^3$ (8.83×10$^{-3}$ g/cc), BaO=0.06 g/cc, $Cs_2O$=0.02 g/cc and Al$_2$O$_3$=0.08 g/cc. The resulting material was subjected to a drying step and a firing step to produce catalyst 30.

(Catalyst 31)

To (commercial γ-Al$_2$O$_3$ were added cerium acetate and cerium oxide (an oxygen storage capacity (OSC) improver in steady-state operation) in an amount of 30% by weight in terms of oxide. The mixture was wet-pulverized, dried, and calcinated at 550° C. to obtain an Al$_2$O$_3$—CeO$_2$ compound oxide. This compound oxide was impregnated with an aqueous H$_2$PtCl$_5$ solution or an aqueous Rh(NO$_3$)$_3$ solution, dried, and fired at 500° C. to obtain a Pt-supported Al$_2$O$_3$—CeO$_2$ compound oxide powder and a Rh-supported Al$_2$O$_3$—CeO$_2$ compound oxide powder. To each of these compound oxide powders were added appropriate amounts of water and acetic acid. One of the resulting mixtures, containing the Pt-supported Al$_2$O$_3$—CeO$_2$ compound oxide powder was coated on a monolithic carrier (a cordierite honeycomb manufactured by NGK Insulators, Ltd. having a diameter of 144 mm and a length of 100 mm) to allow the carrier to support 0.15 g/cc of the Pt-supported Al$_2$O$_3$—CeO$_2$ compound oxide powder as a first catalyst layer. On the first catalyst layer was coated the other mixture containing the Rh-supported Al$_2$O$_3$—CeO$_2$ compound oxide powder, to allow the first catalyst layer to support 0.05 g/cc of the Rh-supported Al$_2$O$_3$—CeO$_2$ compound oxide powder as a second catalyst layer. The resulting material was fired at 500° C. to produce catalyst 31. Incidentally, the total amount of supported noble metals in the catalyst 31 was 40 g/ft$^3$ (1.41×10$^{-3}$ g/cc) (Pt/Rh=5/1).

(Catalyst 32)

To commercial γ-Al$_2$O$_3$ were added cerium acetate and cerium oxide (an oxygen storage capacity (OSC) improver in steady-state operation) in an amount of 30% by weight in terms of oxide. The mixture was wet-pulverized, dried, and calcinated at 550° C. to obtain an Al$_2$O$_3$—CeO$_2$ compound oxide. Part of the Al$_2$O$_3$—CeO$_2$ compound oxide was impregnated with, an aqueous H$_2$PtCl$_5$ solution, an aqueous barium nitrate solution and an aqueous cesium nitrate solution. The remainder of the Al$_2$O$_3$—CeO$_2$ compound oxide was impregnated with an aqueous Rh(NO$_3$)$_3$ solution. The resulting materials were independently dried and fired at 700° C. to obtain a Pt/Ba/Cs-supported Al$_2$O$_3$—CeO$_2$ compound oxide powder and a Rh-supported Al$_2$O$_3$—CeO$_2$ compound oxide powder. To each of these compound oxide powders were added appropriate amounts of water and acetic acid. One of the resulting mixtures, containing the Pt/Ba/Cs-supported Al$_2$O$_3$—CeO$_2$ compound oxide powder was coated on a monolithic carrier (a cordierite honeycomb manufactured by NGK Insulators, Ltd. having a diameter of 144 mm and a length of 100 mm) to allow the carrier to support 0.15 g/cc of the Pt/Ba/Cs-supported Al$_2$O$_3$—CeO$_2$ compound oxide powder as a first catalyst layer. On the first catalyst layer was coated the other mixture containing the Rh-supported Al$_2$O$_3$—CeO$_2$ compound oxide powder, to allow the first catalyst layer to support 0.05 g/cc of the Rh-supported Al$_2$O$_3$—CeO$_2$ compound oxide powder as a second catalyst layer. The resulting material was fired at 500° C. to produce catalyst 32. Incidentally, the total amount of supported noble metals in the catalyst 32 was 40 g/ft$^3$ (1.41×10$^{-3}$ g/cc) (Pt/Rh=5/1).

[Production of adsorbent-catalysts]

(Adsorbent-catalyst 1)

0.12 g/cc of β-zeolite (a product of The PQ Corporation) (SiO$_2$/Al$_2$O$_3$ molar ratio=150) was supported on a cordierite honeycomb structure (a product of NGK Insulators, Ltd.) having a diameter of 144 mm, a length of 100 mm, a rib thickness of 150 μm and a cell density of 400 cells/in.$^2$). The resulting material was fired at 550° C. to form a first layer of β-zeolite on the honeycomb structure. Separately, to commercial γ-Al$_2$O$_3$ were added an aqueous palladium nitrate solution and an appropriate amount of acetic acid. The mixture was pulverized in a ball mill for 15 hours. The resulting slurry was dried at 100° C. for 15 hours, pulverized, and fired at 550° C. for 3 hours to obtain a Pd-predoped Al$_2$O$_3$ powder. The Pd-predoped Al$_2$O$_3$ powder was mixed with an appropriate amount of water. Thereto were added an appropriate amount of acetic acid and an alumina sol having a solid alumina content of 2.5%. The resulting mixture was pulverized in a ball mill for 15 hours to produce a slurry. The slurry was coated on the first layer formed previously on the honeycomb structure, and fired to form a second layer on the first layer, whereby adsorbent-catalyst 1 was produced. The supported amounts of the second layer were Pd=150 g/ft$^3$ (5.30×10$^{-3}$ g/cc) and Al$_2$O$_3$=0.05 g/cc.

(Adsorbent-catalyst 2)

0.12 g/cc of β-zeolite (a product of The PQ Corporation) (SiO$_2$/Al$_2$O$_3$ molar ratio=150) was supported on a cordierite honeycomb structure (a product of NGK Insulators, Ltd.) having a diameter of 144 mm, a length of 100 mm, a rib thickness of 150 μm and a cell density of 400 cells/in.$^2$). The resulting material was fired at 550° C. to form a first layer of β-zeolite on the honeycomb structure. Separately, to commercial γ-Al$_2$O$_3$ were added an aqueous palladium nitrate solution and an appropriate amount of acetic acid. The mixture was pulverized in a ball mill for 15 hours. The resulting slurry was dried at 100° C. for 15 hours, pulverized, and fired at 550° C. for 3 hours to obtain a Pd-predoped Al$_2$O$_3$ powder. The Pd-predoped Al$_2$O$_3$ powder was impregnated with an aqueous barium nitrate solution, an aqueous cesium nitrate solution and an appropriate amount of acetic acid. The resulting material was pulverized in a ball mill for 15 hours. The resulting slurry was dried at 100° C. for 15 hours, pulverized and fired at 700° C. for 3 hours to obtain a Pd/Ba/Cs-predoped Al$_2$O$_3$ powder.

The Pd/Ba/Cs-predoped Al$_2$O$_3$ powder was mixed with an appropriate amount of water. Thereto were added an appropriate amount of acetic acid and an alumina sol having a solid alumina content of 2.5%. The resulting mixture was pulverized in a ball mill for 15 hours to produce a slurry. The slurry was coated on the first layer formed previously on the honeycomb structure, and fired to form a second layer on the first layer, whereby adsorbent-catalyst 2 was produced. The supported amounts of the second layer were Pd=150 g/ft$^3$ (5.30×10$^{-3}$ g/cc), BaO=0.04 g/cc, Cs$_2$O=0.01 g/cc and Al$_2$O$_3$=0.05 g/cc.

Evaluation of light-off performances of catalysts

The catalysts 1–30 produced above were evaluated for light-off performance according to the following method. In the exhaust gas line of an actual engine was set any of the above-produced catalysts so that the exhaust gas temperature at the gas inlet became 750° C.; and the engine was operated for 60 seconds at an A/F ratio close to the stoichiometric ratio (14.4). Then, fuel feeding was cut for 5 seconds to shift the A/F ratio to a lean fuel side. In this engine operational mode including the above fuel-cutting, each catalyst was subjected to aging for total 100 hours. To the catalyst after aging was fed an artificial gas having a composition of Table 1 (A/F=14.4), at a space velocity of 40,000 hr$^{-1}$; the gas temperature was increased at a rate of 10° C./min from room temperature; the temperature at which the conversion of HC component in the gas became 50%, was measured and taken as the light-off temperature of the catalyst.

The results are shown in Table 2. As is clear from comparison of the light-off temperatures of the catalysts 1–8, when catalysts contain the same noble metal in the same amount, those catalysts containing both Ba and Cs are superior to those catalysts containing either or none of Ba and Cs, in low-temperature light-off performance. As is clear from comparison of the light-off temperatures of the other catalysts, the light-off performance of catalyst is influenced by the amounts and ratio of noble metal, Ba and Cs; the method for production of catalyst layer; the structure of catalyst layer; etc.

TABLE 1

| Component | Concentration |
|---|---|
| $CO_2$ | 13% |
| $O_2$ | 1.3% |
| CO | 1.8% |
| $H_2$ | 0.6% |
| HC | 3,000 ppmC |
| NO | 950 ppm |
| $H_2O$ | 10% |
| $N_2$ | Balance |

TABLE 2

| | Light-off temp. (° C.) | Remarks |
|---|---|---|
| Catalyst 1 | 307 | Pd catalyst (containing neither Ba nor Cs). |
| Catalyst 2 | 393 | Pt catalyst (containing neither Ba nor Cs). |
| Catalyst 3 | 319 | Rh catalyst (containing neither Ba nor Cs). |
| Catalyst 4 | 238 | Pd/Ba catalyst (containing no Cs). |
| Catalyst 5 | 261 | Pd/Cs catalyst (containing no Ba). |
| Catalyst 6 | 221 | Present catalyst (noble metal: Pd) |
| Catalyst 7 | 313 | Present catalyst (noble metal: Pt) |
| Catalyst 8 | 307 | Present catalyst (noble metal: Rh) |
| Catalyst 9* | 239 | Pd was supported, and then Cs and Ba were supported in this order. |
| Catalyst 10 | 246 | Ba ad Cs were supported, and then Pd was supported. |
| Catalyst 11 | 230 | Pd, Ba and Cs were supported by co-impregnation (simultaneous supporting). |
| Catalyst 12 | 252 | Containing Ba in the form of BaO particles. |
| Catalyst 13 | 250 | Barium hydroxide was used for supporting of Ba. |
| Catalyst 14 | 244 | Pd was supported by predoping, and Ba and Cs were supported by impregnation. |
| Catalyst 15 | 276 | The slurry used had a pH of less than 10. |
| Catalyst 16 | 221 | $CeO_2$ was added. |
| Catalyst 17 | 256 | Containing more than 300 g/ft³ of Pd. |
| Catalyst 18 | 270 | Containing less than 100 g/ft³ of Pd. |
| Catalyst 19 | 280 | Containing more than 0.06 g/cc of BaO. |
| Catalyst 20 | 281 | Containing less than 0.01 g/cc of BaO. |
| Catalyst 21 | 235 | The amount of $Cs_2O$ supported is less than 1/10 of the amount of BaO supported. |
| Catalyst 22 | 237 | The amount of $Cs_2O$ supported is more than two times the amount of BaO supported. |
| Catalyst 23 | 221 | The surface layer contained Rh and the inner layer contained Pd, Ba and Cs. |

TABLE 2-continued

| | Light-off temp. (° C.) | Remarks |
|---|---|---|
| Catalyst 24 | 221 | The surface layer contained Pd, Ba and Cs and the inner layer contained Rh. |
| Catalyst 25 | 223 | The Pd/Ba/Cs-containing layer and the Rh-containing layer were supported on the carrier apart in the lengthwise direction. |
| Catalyst 26 | 223 | The Pd/Ba/Cs-containing layer and the Rh-containing layer were supported on the carrier apart in the radial direction. |
| Catalyst 27 | 255 | The catalyst layer contained Pd, Rh, Ba and Cs in a mixed state. |
| Catalyst 28 | 221 | The Pd/Ba/Cs-containing layer and the Rh-containing layer were supported on respective carriers. |
| Catalyst 29 | 306 | The outer layer contained Rh and the inner layer contained Pd and contained neither Ba nor Cs. |
| Catalyst 30 | 221 | Two layers of different compositions, each containing Pd, Ba and Cs were supported on one same carrier in laminated layers. |

Using the catalysts and adsorbent-catalysts produced above, exhaust gas purification systems shown below were constituted. Incidentally, each numeral shown in FIGS. 1 to 9 was shown in the following description of each system by adding parenthesis to the numeral to avoid confusion between the symbols indicating the kinds of catalysts and adsorbent-catalysts and the numerals used in FIGS. 1 to 9.

(System A)

As shown in FIG. 1, the catalyst 23 (8) was provided in the exhaust pipe of an engine (2) at an upstream site. Between the engine (2) and the catalyst 23 (8) was provided an $O_2$ sensor (4) for A/F ratio control. The distance between the engine manifold outlet and the catalyst 23 (8) was 600 mm. At a position 1,200 mm distant from the engine manifold outlet was provided the catalyst 31 (16).

(System B)

Figure 2:
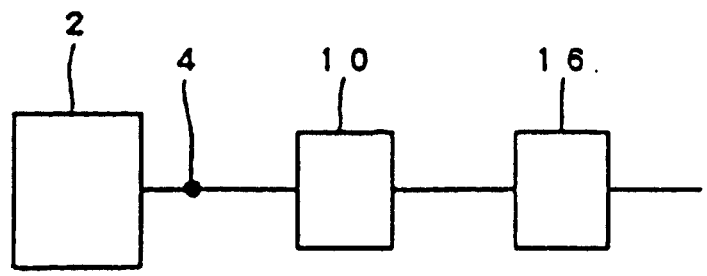
FIG. 2 is a schematic drawing showing a system for exhaust gas purification used in Examples.

As shown in FIG. 2, System B was constituted in the same manner as in the case of System A except that the catalyst 23 (8) was changed to the catalyst 29 (10).

(System C)

Figure 3:
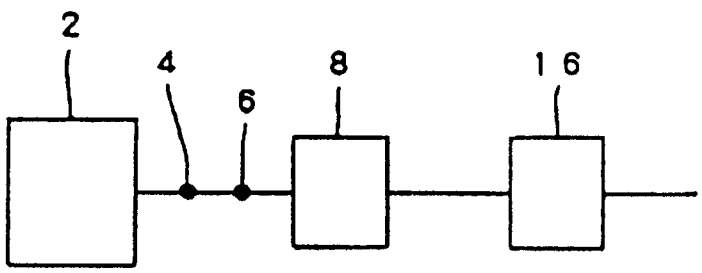
FIG. 3 is a schematic drawing showing a system for exhaust gas purification used in Examples.

As shown in FIG. 3, the catalyst 23 (8) was provided in the exhaust pipe of an engine (2) at an upstream site. Between the engine (2) and the catalyst 23 (8) were provided an $O_2$ sensor (4) for A/F ratio control at an upstream site and a hole (6) for secondary air introduction for promotion of activation at a downstream site. The distance between the engine manifold outlet and the catalyst 23 (8) was 600 mm. At a position 1,200 mm distant from the engine manifold outlet was provided the catalyst 31 (16).

(System D)

Figure 4:
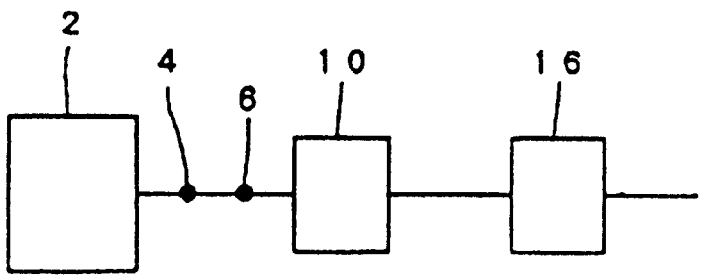
FIG. 4 is a schematic drawing showing a system for exhaust gas purification used in Examples.

As shown in FIG. 4, System D was constituted in the same manner as in the case of System C except that the catalyst 23 (8) was changed to the catalyst 29 (10).

(System E)

Figure 5:
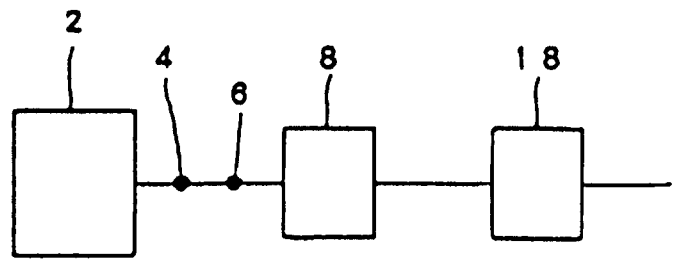
FIG. 5 is a schematic drawing showing a system for exhaust gas purification used in Examples.

As shown in FIG. 5, System E was constituted in the same manner as in the case of System C except that the catalyst 31 (16) was changed to the catalyst 32 (18).

(System F)

Figure 6:
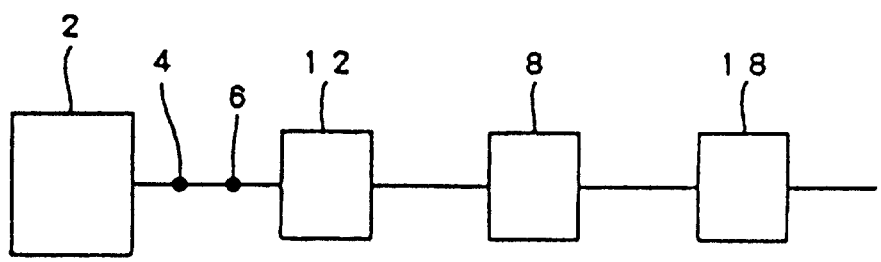
FIG. 6 is a schematic drawing showing a system for exhaust gas purification used in Examples.

As shown in FIG. 6, in the exhaust pipe of an engine (2) were provided the adsorbent-catalyst 1 (12) at an upstream site and the catalyst 23 (8) at a downstream site. Between the engine (2) and the adsorbent-catalyst 1 (12) were provided an $O_2$ sensor (4) for A/F ratio control at an upstream site and a hole (6) for secondary air introduction for promotion of activation at a downstream site. The distance between the engine manifold outlet and the adsorbent-catalyst 1 (12) was 600 mm, and the distance between the adsorbent-catalyst 1 (12) and the catalyst 23 (8) was 30 mm. At a position 1,200 mm distant from the engine manifold outlet was provided the catalyst 32 (18).
(System G)

Figure 7:
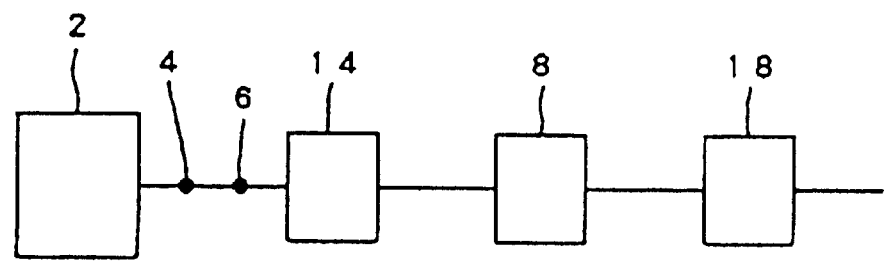
FIG. 7 is a schematic drawing showing a system for exhaust gas purification used in Examples.

As shown in FIG. 7, System G was constituted in the same manner as in the case of System F except that the adsorbent-catalyst 1 (12) was changed to the adsorbent-catalyst 2 (14).
(System H)

Figure 8:
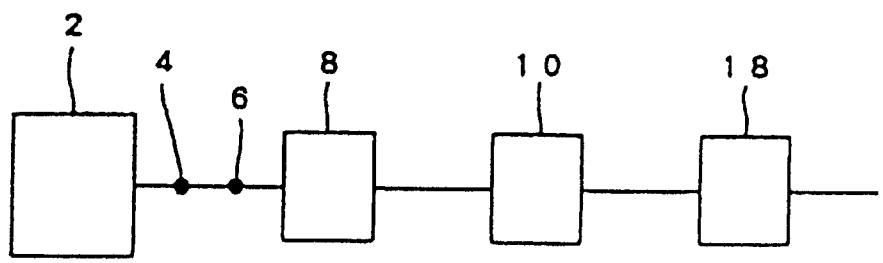
FIG. 8 is a schematic drawing showing a system for exhaust gas purification used in Examples.

As shown in FIG. 8, in the exhaust pipe of an engine (2) were provided the catalyst 23 (8) at an upstream site and the catalyst 29 (10) at a downstream site. Between the engine (2) and the catalyst 23 (8) were provided an $O_2$ sensor (4) for A/F ratio control at an upstream site and a hole (6) for secondary air introduction for promotion of activation at a downstream site. The distance between the engine manifold outlet and the catalyst 23 (8) was 600 mm, and the distance between the catalyst 23 (8) and the catalyst 29 (10) was 30 mm. At a position 1,200 mm distant from the engine manifold outlet was provided the catalyst 32 (18).
(System I)

Figure 9:
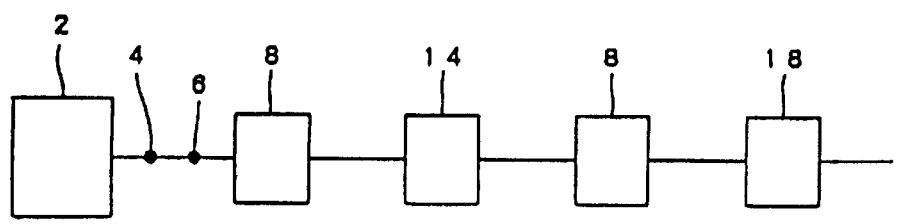
FIG. 9 is a schematic drawing showing a system for exhaust gas purification used in Examples.

As shown in FIG. 9, in the exhaust pipe of an engine (2) were provided the first catalyst 23 (8), the adsorbent-catalyst 2 (14) and the second catalyst 23 (8) in this order from the upstream side of the pipe. Between the engine (2) and the first catalyst 23 (8) were provided an $O^2$ sensor (4) for A/F ratio control at an upstream site and a hole (6) for secondary air introduction for promotion of activation at a downstream site. The distance between the engine manifold outlet and the first catalyst 23 (8) was 600 mm, and the distance between the catalyst 23 (8) and the adsorbent-catalyst 2 (14) was 30 mm. At a position 1,200 mm distant from the engine manifold outlet was provided the catalyst 32 (18).
Evaluation of performances of exhaust gas purification systems Each of the above-prepared Systems A to I was fitted to a test vehicle having a six-cylinder engine of 4,000 cc displacement mounted thereon. A FTP (LA-4 mode) was conducted. In Systems C to I, in order to obtain an oxygen-excessive exhaust gas, secondary air was introduced from the hole for secondary air introduction, using an air pump, at a rate of 100 l/min for 90 seconds from the engine cranking. The exhaust gas discharged from the engine was collected by the CVS method and measured for emission values. The results are shown in Table 3. As shown in Table 3, the systems using the present catalyst, as compared with other systems, could give remarkably low emission values.

TABLE 3

|  | HC emission (g/mile) | NOx emission (g/mile) | Secondary air introduction |
| --- | --- | --- | --- |
| System A* | 0.109 | 0.31 | No |
| System B | 0.163 | 0.41 | No |
| System C* | 0.094 | 0.37 | Yes |
| System D | 0.129 | 0.56 | Yes |
| System E* | 0.091 | 0.35 | Yes |
| System F* | 0.065 | 0.35 | Yes |
| System G* | 0.058 | 0.35 | Yes |
| System H* | 0.085 | 0.34 | Yes |
| System I* | 0.052 | 0.34 | Yes |

(The systems with * mark are systems using a catalyst of the present invention.)

As described above, the catalyst for exhaust gas purification according to the present invention is superior in low-temperature light-off performance and can effectively purify the harmful substances present in the exhaust gas discharged from an internal combustion engine of automobile or the like; in particular, the HC discharged in a large amount during the cold start of automobile engine. Further, the system for exhaust gas purification according to the present invention, which comprises the above catalyst superior in low-temperature light-off performance and an adsorbent having HC adsorbability, can even more effectively purify the HC discharged during the cold start.

What is claimed is:

1. A catalyst for exhaust gas purification capable of purifying hydrocarbons, nitrogen oxides and carbon monoxide present in exhaust gas discharged from an internal combustion engine, which catalyst comprises:

a monolithic carrier; and a catalyst layer containing at least one noble metal, together with Ba and Cs, formed on the carrier, wherein the amount of the noble metal supported on said monolithic carrier is 10–700 g/ft$^3$ ($3.53 \times 10^{-4}$ to $2.47 \times 10^{-2}$ g/cc);

and, Ba is supported on the monolithic carrier in an amount of 0.01–0.06 g/cc in terms of the amount of BaO;

and a weight ratio of Cs expressed as $Cs_2O$ and Ba expressed as BaO is 1:0.5 to 1:70.

2. A catalyst for exhaust gas purification according to claim 1, wherein the Ba and Cs contained in the catalyst layer form a compound oxide.

3. A catalyst for exhaust gas purification according to claim 1, wherein the at least one kind of noble metal contained in the catalyst layer is selected from at least one element selected from a group consisting of Pd, Pt and Rh.

4. A catalyst for exhaust gas purification according to claim 1, wherein the at least one kind of noble metal contained in the catalyst layer is Pd.

5. A catalyst for exhaust gas purification according to claim 1, wherein the one kind of noble metal contained in the catalyst layer is Pd and the amount of Pd supported on the monolithic carrier is 100–300 g/ft$^3$ ($3.53 \times 10^{-3}$ to $1.06 \times 10^{-2}$ g/cc).

6. A catalyst for exhaust gas purification according to claim 1, wherein the catalyst layer is divided into a layer containing the noble metal, Ba and Cs and a layer containing the noble metal (and containing neither Ba nor Cs) and these layers are formed on one same monolithic carrier.

7. A catalyst for exhaust gas purification according to claim 6, wherein the layer containing the noble metal, Ba and Cs and the layer containing the noble metal (and containing neither Ba nor Cs) are formed in laminated layers on on monolithic carrier.

8. A catalyst for exhaust gas purification according to claim 7, wherein the layer containing the noble metal (and containing neither Ba nor Cs) is laminated on the layer containing the noble metal, Ba and Cs.

9. A catalyst for exhaust gas purification according to claim 1, wherein the catalyst layer further comprises a heat-resistant inorganic oxide.

10. A catalyst for exhaust gas purification according to claim 9, wherein the heat-resistant inorganic oxide is active alumina.

11. A catalyst for exhaust gas purification according to claim 9, wherein the noble metal, Ba and Cs are supported on the heat-resistant inorganic oxide in the catalyst layer.

12. A catalyst for exhaust gas purification according to claim 9, wherein the noble metal, Ba and Cs are supported on the heat-resistant inorganic oxide in the catalyst layer and the noble metal is supported on the heat-resistant inorganic oxide in direct contact therewith.

13. A catalyst for exhaust gas purification according to claim 1, wherein the catalyst layer further contains $CeO_2$.

14. A system for exhaust gas purification comprising:

a catalyst for exhaust gas purification comprising a monolithic carrier and a catalyst layer containing at least one noble metal, Ba and Cs, formed on the carrier, wherein the amount of noble metal supported on said monolithic carrier is 10 to 700 $g/ft^3$ ($3.53 \times 10^{-4}$ to $2.47 \times 10^{-2}$ g/cc), the amount of Ba supported on the monolithic carrier is 0.01 to 0.06 g/cc in terms of the amount of BaO, and a weight ratio of Cs expressed as $Cs_2O$ and Ba expressed as BaO is 1:0.5 to 1:70 and wherein said system is provided in an exhaust pipe for an internal combustion engine, and an adsorbent having hydrocarbon adsorbability is provided in said exhaust pipe.

15. A system for exhaust gas purification according to claim 14, further comprising a additional catalyst provided in the exhaust pipe.

16. A system for exhaust gas purification according to claim 15, wherein the additional catalyst contains Pd as a catalyst active component.

* * * * *